US012742489B2

(12) United States Patent
Heitzer et al.

(10) Patent No.: US 12,742,489 B2
(45) Date of Patent: Sep. 22, 2026

(54) DEVICE FOR PRESSING A RACK AGAINST A PINION, STEERING DEVICE HAVING SUCH A DEVICE, AND METHOD FOR PRODUCING SUCH A DEVICE AND/OR STEERING DEVICE

(71) Applicants: ZF Automotive Germany GmbH, Alfdorf (DE); ZF Automotive UK Limited, Solihull (GB); ZF Automotive Italia S.r.l., Turin (IT)

(72) Inventors: Heinz-Dieter Heitzer, Heinsberg (DE); Frank Jaehde, Cologne (DE); Matthias Kaussen, Bochum (DE); Eduard Span, Cologne (DE); Dominik Streeck, Solingen (DE); Christian Wutzler, Kaarst (DE); Roger Hooke, Birmingham (GB); Angelo Piantoni, Brescia (IT); Luca Tabaglio, Concesio (IT); Pradeepkumar Thandapani, Marcheno (IN); Jacopo Cabassi, Castegnato (IT); Alessio Lo Coco, Vestone (IT)

(73) Assignees: ZF Automotive Germany GmbH, Alfdorf (DE); ZF Automotive UK Limited, Solihull (GB); ZF Automotive Italia S.r.l., Turin (IT)

( * ) Notice: Subject to any disclaimer, the term of this patent is extended or adjusted under 35 U.S.C. 154(b) by 0 days.

(21) Appl. No.: 18/353,497

(22) Filed: Jul. 17, 2023

(65) Prior Publication Data

US 2025/0027554 A1 Jan. 23, 2025

(51) Int. Cl.
*F16H 19/04* (2006.01)
*B62D 3/12* (2006.01)

(52) U.S. Cl.
CPC ............. *F16H 19/04* (2013.01); *B62D 3/123* (2013.01); *F16H 2019/046* (2013.01)

(58) Field of Classification Search
CPC .... F16H 19/04; F16H 2019/046; B62D 3/123
USPC .............................................................. 74/29
See application file for complete search history.

(56) References Cited

U.S. PATENT DOCUMENTS 8,443,689 B2 * 5/2013 Kawakubo ............. B62D 3/123 74/422
8,899,119 B2 12/2014 Bareis
9,321,477 B2 4/2016 Bae et al.
(Continued)

FOREIGN PATENT DOCUMENTS

DE 10354776 A1 6/2005
DE 102006006535 A1 8/2007
JP S63188566 A 8/1988

*Primary Examiner* — T. Scott Fix
(74) *Attorney, Agent, or Firm* — Kristin L. Murphy

(57) ABSTRACT

The disclosure relates to a device for pressing a rack against a pinion, having a thrust piece, having a bearing element, and having a preloading element which acts in the axial direction of a central longitudinal axis of the device, and having a readjustment installation for compensating wear, and having an axial play installation for defining a maximum play of the thrust piece in the axial direction to the central longitudinal axis, the axial play installation being disposed between the readjustment installation and the bearing element, and the axial play installation having an elastic spring element which acts in the axial direction to the central longitudinal axis.

15 Claims, 12 Drawing Sheets

(56) References Cited

U.S. PATENT DOCUMENTS

| | | | | |
|---|---|---|---|---|
| 9,587,723 | B2 * | 3/2017 | Speidel | B62D 3/123 |
| 2011/0297472 | A1 * | 12/2011 | Bareis | B62D 3/123<br>74/395 |

* cited by examiner

DEVICE FOR PRESSING A RACK AGAINST A PINION, STEERING DEVICE HAVING SUCH A DEVICE, AND METHOD FOR PRODUCING SUCH A DEVICE AND/OR STEERING DEVICE

CROSS-REFERENCE TO RELATED APPLICATION

This application claims priority to German Priority Application No. 102022207303.7, filed Jul. 18, 2022, the disclosure of which is incorporated herein by reference in its entirety.

TECHNICAL FIELD

The disclosure relates to a device for pressing a rack against a pinion, having a thrust piece, having a bearing element, and having a preloading element which acts in the axial direction of a central longitudinal axis of the device, the thrust piece by means of the preloading element disposed between the bearing element and the thrust piece being impinged with a preloading force acting in the axial direction to the central longitudinal axis and directed away from the bearing element, and having a readjustment installation for compensating wear, the readjustment installation being disposed between the thrust piece and the bearing element, and having an axial play installation for defining a minimum play of the thrust piece in the axial direction to the central longitudinal axis, the axial play installation being disposed between the readjustment installation and the bearing element, and the axial play installation having an elastic spring element which acts in the axial direction to the central longitudinal axis. The disclosure furthermore relates to a steering device for a vehicle, and having a rack which is mounted so as to be displaceable in the direction of a longitudinal axis of the rack, and having a pinion, the rack engaging in the pinion, and having a device mentioned at the outset for pressing the rack against the pinion.

BACKGROUND

A device, or steering device, of this type is known from U.S. Pat. No. 8,899,119 B2. A spring washer as an elastic spring element is disposed here between the readjustment installation and the bearing element configured as a set screw, the spring washer being jammed, or fixed, and thus mounted, between the readjustment installation and the set screw. The set screw has a depression, the spring washer by virtue of the interaction with a cam of the readjustment installation and a partial elastic deformation of the spring washer being able to extend into the space provided by the depression.

In particular, conventional steering devices have a steering gear having the rack and the pinion, such as a pinion shaft, the pinion or the pinion shaft meshing with a toothed region of the rack. A rotational force which by way of a steering wheel is applied to the steering shaft and the pinion or the pinion shaft can be converted into a force for displacing the rack and by way of the latter transmitted to steerable wheels of the vehicle. Steering devices having a rack can be configured as hydraulic, electro-hydraulic or electric steering systems which assist a driver of the vehicle during the steering procedure, for example. Moreover, a steering device having a rack can be configured as a so-called steer-by-wire steering system.

Since significant forces can arise to some extent in a steering gear, it has been recognized at an early stage already that particular arrangements have to be made in order to maintain an ideally play-free engagement between the rack and the pinion or the pinion shaft. Otherwise, there is the risk that the rack under load moves away from the pinion or the pinion shaft, for example, in that said rack is deformed transversely to the longitudinal direction of the rack, for example. This can lead to the play in the steering system being undesirably increased, increased play in the steering system potentially having a negative influence on the steering behavior of the vehicle and/or causing annoying knocking sounds.

In order to prevent this, a thrust piece which impinges the rack with an ideally constant contact pressure force in the direction of the pinion or the pinion shaft is usually used in the region of the pinion or the pinion shaft. The setting of a desired or defined contact pressure force and/or the consideration of signs of wear and/or the avoidance of annoying rattling sounds during the operation represent challenges in terms of the configuration of the device for pressing down the rack and in terms of a steering device configured with such a device.

The disclosure is based on the object of refining a device and/or a steering device of the type mentioned at the outset in such a manner that signs of wear can be compensated and/or defined tolerances can be adhered to in an ideally reliable manner. The intention is to define a minimum play within the device, or in terms of the thrust piece in the axial direction.

SUMMARY

The device is configured to press a rack against a pinion. In particular, the device has a rack and a pinion, the pinion being in particular configured as a pinion shaft. The device has a thrust piece. Furthermore, the device can have a housing, the thrust piece within the housing being guided so as to be displaceable in the axial direction of a central longitudinal axis of the device and/or of a housing interior of the housing. The housing interior of the housing can be of a hollow-cylindrical configuration.

The device has a bearing element. The bearing element can be fixed in the axial direction to the central longitudinal axis on the housing. The bearing element can be configured as a cover or as a lid by way of which the housing interior is closed.

Furthermore, the device has a preloading element which acts in the axial direction of the central longitudinal axis of the device. The preloading element is disposed between the bearing element and the thrust piece. The thrust piece by the preloading element is impinged with a preloading force acting in the axial direction to the central longitudinal axis and directed away from the bearing element. In particular, the preloading element effects the pressing action of the thrust piece against the rack and thereby causes the rack to be pressed against the pinion. The preloading element can be supported on the bearing element, on the one hand, and on the thrust piece, on the other hand. In particular, the preloading element by way of a first end, or by way of a first side, rests directly on the bearing element, and by way of a second end or second side, which faces away from the first end or from the first side, rests directly on the thrust piece.

The device has a readjustment installation for compensating wear, the readjustment installation being disposed between the thrust piece and the bearing element. In particular, the readjustment installation has two disks which are rotatable relative to one another. The two disks can rest on one another on contact faces. The disks and/or the contact faces have at least two oblique area segments or wedge portions. The readjustment installation can have a torsion spring. The two disks can be rotated relative to one another by the torsion spring. In this way, the readjustment installation can automatically compensate wear-related play which is created in the course of the operation and/or compensate settling of the rack, of the thrust piece and/or wear of a friction element disposed between the rack and thrust piece. Additional play, in particular in the axial direction of the central longitudinal axis, which arises in the course of the operation and/or is related to wear can be reduced or compensated by the readjustment installation.

The device has in particular a friction element. The friction element here is disposed on a side of the thrust piece that serves for resting on the rack and faces away from the preloading element. During operation, the rack can be displaced in the longitudinal direction of the rack by the pinion, so as to steer wheels. The rack slides along the friction element and is simultaneously pressed against the pinion. The friction element has a cross section in the shape of a portion of a circular arc, or substantially in the shape of a portion of a circular arc. This cross section is configured for resting on the rack. The friction element can be formed from a plastics material, for example low-friction PTFE, or comprise the latter.

Furthermore, the device has an axial play installation for defining a minimum play of the thrust piece in the axial direction to the central longitudinal axis. The axial play installation here is disposed between the readjustment installation and the bearing element. The axial play installation has an elastic spring element which acts in the axial direction to the central longitudinal axis.

According to the disclosure, the spring element is disposed or mounted in a depression, the depression being configured in a side of the bearing element that faces the readjustment installation.

It is advantageous here that a minimum play of the device, in particular a minimum play of the thrust piece in the axial direction of the central longitudinal axis, is or can be predetermined in a defined manner by the elastic spring element. The spring element is held and/or fixed in the depression of the bearing element. In this way, a minimum value for an axial play, here referred to as the minimum play, within the device, or in terms of the thrust piece, is or can be defined by the spring element disposed or mounted in the depression. Tolerances of the device can be compensated by virtue of the minimum play thus defined. For example, irregularities of teeth meshing between the pinion and the rack, ovalities of the pinion and/or other tolerance-related variances can be compensated. The required minimum play, or a minimum value for the axial play of the device, in the axial direction of the central longitudinal axis, in particular of the thrust piece, is in particular defined exclusively by the axial play installation.

According to a refinement, the spring element, in particular in an operating state, extends from the depression up to a defined maximum projecting measurement. The spring element in the process exerts directly or indirectly a compressive force on the readjustment installation, and by way of the latter on the thrust piece, in the axial direction of the central longitudinal axis. The projecting measurement defines a or the minimum play of the readjustment installation and/or of the thrust piece in the axial direction of the central longitudinal axis. In this way, the minimum play of the device in the longitudinal direction of the central longitudinal axis is defined or predetermined by the axial play installation, or by the spring element of the axial play installation. In this way, the axial play installation within the defined maximum projecting measurement enables play, or movement, of the readjustment installation and/or of the thrust piece in the direction of the rack and/or away from the rack. As a result, tolerance-related and/or manufacturing-related variances can be compensated in a defined way.

The maximum projecting measurement can be less than 150 μm. The maximum projecting measurement is in particular in the range of 100 μm. The maximum projecting measurement in an assembled state is in a range of 100 μm. A maximum variance of +/−20 μm can arise or be defined here. The maximum projecting measurement is in particular at most 60 μm. For example, in an operating state of the device and/or of the spring element of the axial play installation, the maximum projecting measurement can be 60 μm. In this way, a minimum play of the readjustment installation and/or of the thrust piece in the axial direction of the central longitudinal direction of less than 150 μm, or in the range of 100 μm, or at most 60 μm, can be provided by the spring element.

The device in the operating state is finally assembled in a steering device. The device in the assembled state is in particular in a state provided for assembling in the steering device. In other words, the device in the assembled state is not in a finally assembled state. The spring element can be more heavily compressed in the assembled state than in the operating state. The spring element is compressed to the maximum in the assembled state.

According to a refinement, the depression in that side of the bearing element that faces the readjustment installation is configured as a groove, in particular as an annular groove, or as a hollow-cylindrical depression. The depression can have a central axis, the central axis of the depression coinciding with the central longitudinal axis of the device. If the depression is configured as an annular groove, the latter can be configured to be concentric and/or coaxial with the central axis of the depression, or with the central longitudinal axis of the device. The bearing element can have a through opening. The through opening of the bearing element is in particular configured to be concentric and/or coaxial with the central longitudinal axis of the device. In this way, a central axis of the through opening can coincide with the central longitudinal axis of the device. A depression configured as an annular groove can encircle or encompass the through opening, the latter being configured to be centric in relation to the annular groove. If the depression is configured as a hollow-cylindrical depression, the through opening which is configured to be centric in the hollow-cylindrical depression can be implemented in a base area of the hollow-cylindrical depression.

According to a refinement, the elastic spring element is configured as an O-ring or as an annular spring washer. If the spring element is configured as an O-ring, the latter can be produced from an elastic plastics material or rubber material. If the spring element is configured as an annular spring washer, the latter can be formed from metal. The annular spring washer is in particular configured as a corrugated annular spring washer. The annular spring washer is calibrated in terms of its dimensions and/or its elasticity. The dimensions and/or the elasticity of the annular spring washer can be within an in particular very minor or tight tolerance range.

According to a further exemplary arrangement, the axial play installation has a play delimitation element. The play delimitation element here is disposed between the elastic spring element and the readjustment installation. The play delimitation element rests on the elastic spring element, on the one hand, and on the readjustment installation, in particular a disk of the readjustment installation, on the other hand. The play delimitation element is in particular disposed outside the depression. The maximum projecting measurement by which the spring element extends from the depression can be defined by the play delimitation element.

The play delimitation element can have at least one outer peripheral portion which is radial in relation to the central longitudinal axis of the device. The play delimitation element has in particular two radial peripheral portions that face away from one another. The at least one peripheral portion, or the two peripheral portions, can be configured in the manner of a protrusion. In particular, the at least one radial peripheral portion, or the two radial peripheral portions, is/are disposed in a retaining groove of the bearing element. The maximum projecting measurement by which the spring element extends from the depression can be defined by virtue of the interaction between the retaining groove and the play delimitation element.

The bearing element has in particular an annular wall portion for receiving the readjustment installation. The readjustment installation can be guided in the axial direction of the central longitudinal axis by the annular wall portion.

The retaining groove is configured in an internal side and in the radial extension of that side of the bearing element that faces the readjustment installation. The height of the retaining groove derived parallel to the central longitudinal axis of the device in comparison to the material thickness of the at least one radial peripheral portion of the play delimitation element is configured in such a manner that a maximum play for the play delimitation element in the axial direction, or in the longitudinal direction of the central longitudinal axis, which corresponds to the defined maximum projecting measurement results.

The internal side of the annular wall portion can have at least one introduction groove which for introducing the at least one peripheral portion of the play delimitation element is aligned parallel to the central longitudinal axis. The at least one introduction groove in this way enables the assembling of the play delimitation element in the retaining groove of the bearing element.

The play delimitation element is configured as an annular washer, in particular from metal. The play delimitation element can have at least one recess for interacting with an introduction tool. The play delimitation element can be introduced into the at least one introduction groove, or into two mutually opposite introduction grooves, and be assembled in the retaining groove by the introduction tool.

A steering device for a vehicle, and having a rack which is mounted so as to be displaceable in the direction of a longitudinal axis of the rack is particularly advantageous. The steering device here has a pinion, the rack engaging in the pinion. The steering device has a device according to the disclosure for pressing the rack against the pinion, the rack being pressed against the pinion by the device, and the thrust piece being disposed so as to be displaceable within a housing and in the axial direction of the central longitudinal axis, the bearing element being fixed to the housing. In particular, the steering device is refined according to the exemplary arrangements explained in the context of the device according to the disclosure described herein.

Furthermore advantageous is a method for producing a device according to the disclosure and/or a steering device according to the disclosure. In this method the thrust piece and the preloading element as individual components are first inserted successively into a housing interior of a housing. An assembly module, composed of an assembling element, the bearing element, the axial play installation and the readjustment installation, is subsequently fixed in the housing, in particular screwed into the latter. The spring element, which within the assembly module is in an assembled state, is received completely within the depression configured in the bearing element in the process.

BRIEF DESCRIPTION OF DRAWINGS

The disclosure will be explained in more detail hereunder by the figures. Identical reference signs here relate to the same, similar or functionally equivalent components or elements. In the figures.

DETAILED DESCRIPTION

Figure 1:
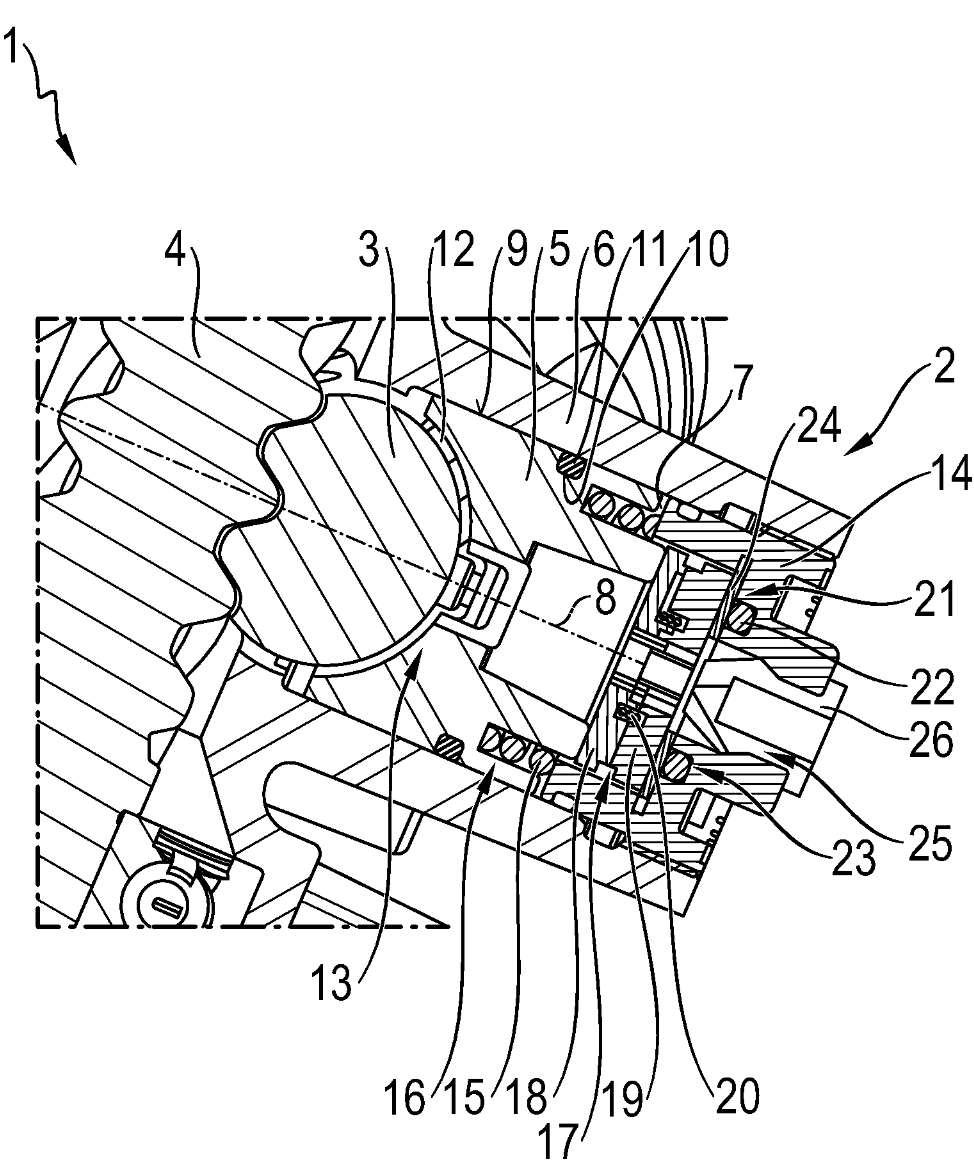
FIG. 1 shows a fragment of a sectional lateral view of a steering device according to the disclosure, having a first device according to the disclosure.

FIG. 1 shows a fragment of a sectional lateral view of a steering device 1 according to the disclosure, having a first device 2 according to the disclosure. The steering device 1 has a rack 3. The steering device 1 furthermore has a pinion 4, the pinion 4 here being implemented as a pinion shaft. The rack 3 is pressed against the pinion 4 by the device 2. Teeth of the rack 3 and of the pinion 4 mutually engage as a result. For pressing the rack 3 against the pinion 4, the device 2 has a thrust piece 5. The device 2, or the thrust piece 5, respectively, is disposed on a side of the rack 3 that faces away from the pinion 4.

The steering device 1 has a housing 6. The housing 6 can be configured as a dedicated housing, or be configured as an integral component part of a gearbox housing of a steering gear for the steering device 1. The housing 6 forms a housing interior 7. The device 2, and thus also the thrust piece 5, are disposed within the housing 6, or in the housing interior 7, respectively. The thrust piece 5 here is guided so as to be displaceable in the axial direction of a central longitudinal axis 8 of the housing interior 7. The central longitudinal axis 8 here simultaneously represents the central longitudinal axis 8 of the device 2. The housing interior 7 in this exemplary arrangement is of a hollow-cylindrical configuration. The thrust piece 5 rests on an internal side of the housing interior 7 so as to be able to slide thereon. Accordingly, the thrust piece 5 has a cylindrical external face 9 which corresponds to the internal side of the housing interior 7. In this exemplary arrangement, an encircling groove 10 is configured in the external face 9 of the thrust piece 5. A seal 11 is disposed in the groove 10. The seal 11 in this exemplary arrangement is implemented as an O-ring.

In this exemplary arrangement, a friction element 12 is disposed between the thrust piece 5 and the rack 3. For steering wheels which are not illustrated in more detail here, the rack 3 during operation can be displaced in the longitudinal direction of the rack 3 by the pinion 4. In the process, the rack 3 slides along the friction element 12 and by the thrust piece 5 is simultaneously pressed against the pinion 4. The friction element 12 is thereby held on the thrust piece 5. The friction element 12 in this exemplary arrangement has a cross section in the shape of a portion of a circular arc, which enables partial encompassing or resting on the rack 3. The friction element 12 is disposed in a recess 13 of the thrust piece 5, which is configured in a corresponding manner. For low friction sliding of the rack 3 on the friction element 12, the latter in this exemplary arrangement is formed from a PTFE plastics material.

The device 2 furthermore has a bearing element 14. The bearing element 14 in this exemplary arrangement is configured as a cover, or as a lid, or as a closure, respectively. The housing interior 7 is closed by the bearing element 14. In detail, an opening of the housing 6, or of the housing interior 7, that faces away from the pinion 4 is closed by the bearing element 14. The bearing element 14 is fixed in the axial direction to the central longitudinal axis 8 on the housing 6.

The device 2 moreover has a preloading element 15 which acts in the axial direction to the central longitudinal axis 8. In this exemplary arrangement, the thrust piece 5 has an annular groove 16 in which the preloading element 15 is disposed and from the annular groove extends in the direction of the bearing element 14. In this way, the preloading element 15 in the assembled state illustrated here is disposed between the thrust piece 5 and the bearing element 14. The preloading element 15 in this exemplary arrangement is configured as a compression spring or coil spring. The thrust piece 5 here by the preloading element 15 is impinged with a preloading force in the axial direction to the central longitudinal axis 8 and directed away from the bearing element 14. In this way, the preloading element 15 is supported directly on the thrust piece 5, on the one hand, and directly on the bearing element 14, on the other hand.

The device 2 furthermore has a readjustment installation 17 for compensating wear. The readjustment installation 17 here is disposed between the thrust piece 5 and the bearing element 14. The readjustment installation 17 has two disks 18, 19 which are rotatable relative to one another. Furthermore, the readjustment installation 17 has a torsion spring 20. The torsion spring 20 is disposed between the two disks 18, 19, the two disks 18, 19 being able to be rotated relative to one another by the torsion spring 20. In the event of wear, the two disks 18, 19 by the torsion spring are rotated relative to one another as a result of which a height of the readjustment installation 17 in the axial direction of the central longitudinal axis 8 increases. Wear which occurs in the course of the operation can thus be compensated automatically or in a self-acting manner by the readjustment installation 17. Reverse rotation of the two disks 18, 19 is prevented of a self-locking mechanism which is of a suitable configuration and acts between the two disks 18, 19.

The device 2 has an axial play installation 21 for defining a minimum play of the thrust piece 5 in terms of a movement in the axial direction to the central longitudinal axis 8. The axial play installation 21 is disposed between the readjustment installation 17 and the bearing element 14. The axial play installation 21 here has an elastic spring element 22 which acts in the axial direction to the central longitudinal axis 8. The spring element 22 in this exemplary arrangement is configured as an O-ring. The spring element 22 is disposed or mounted in a depression 23. The depression 23 is configured in a side of the bearing element 14 that faces the readjustment installation 17. The axial play installation 21 in this exemplary arrangement moreover has a play delimitation element 24. The play delimitation element 24 is disposed between the elastic spring element 22 and the readjustment installation 17 and outside the depression 23.

In the operating state of the device 2, illustrated here, a through opening 25 of the bearing element 14 is closed by a closure element 26.

Figure 2:
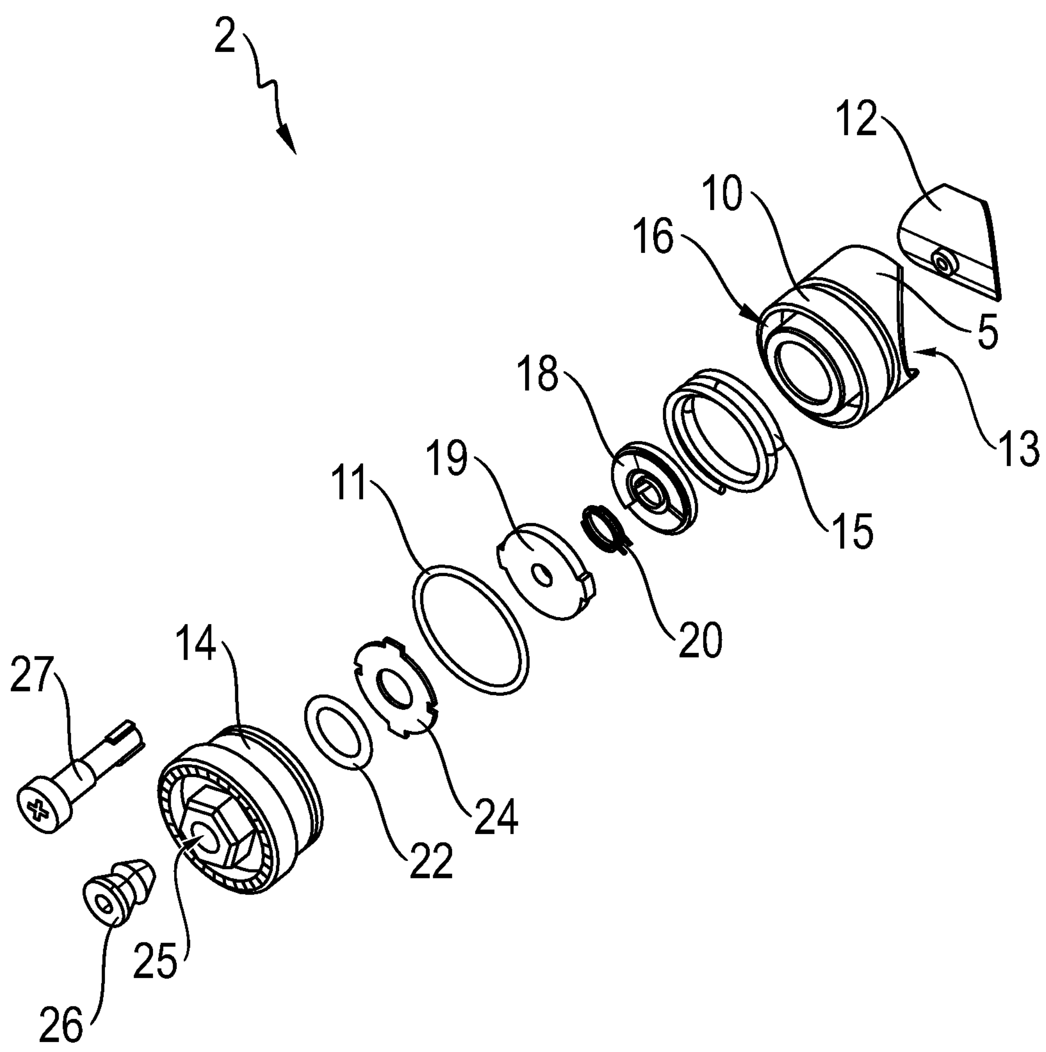
FIG. 2 shows an exploded view of individual parts of the first device according to the disclosure and according to FIG. 1.

FIG. 2 shows an exploded illustration of individual parts of the first device 2 according to the disclosure and according to FIG. 1. The same features are provided with the same reference signs as above. To this extent, reference is also made to the above description for the avoidance of repetitions.

In another exemplary arrangement for the closure element 26, an assembling element 27 is additionally illustrated here. As will yet be explained in more detail hereunder, the assembling element 27 is required for assembling the device 2 in the housing 6 according to FIG. 1.

Figure 3:
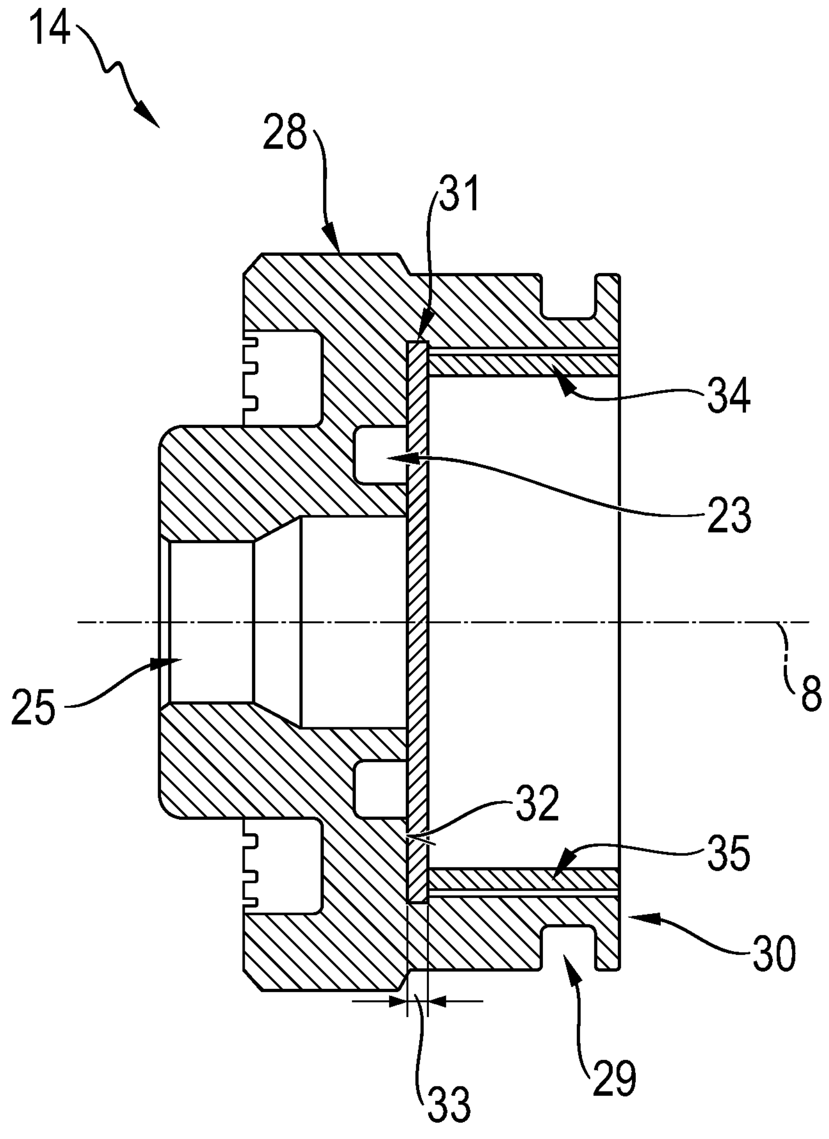
FIG. 3 shows a sectional lateral view of a bearing element for the first device according to the disclosure and according to FIG. 1 or 2.

FIG. 3 shows a sectional lateral view of the bearing element 14 for the first device 2 according to the disclosure and according to FIG. 1 or 2. The depression 23, which is configured as an annular groove, has a central axis which is not illustrated in more detail here and coincides with the central longitudinal axis 8.

An external thread 28 is configured on an external circumference of the bearing element 14. The bearing element 14, for fixing to the housing 6 according to FIG. 1, by the external thread 28 is screwed into a correspondingly configured internal thread in an internal side of the housing 6, or of the housing interior 7.

Furthermore, in this exemplary arrangement the bearing element 14 on the external circumference thereof has an annular groove 29 for receiving a sealing element in the form of an O-ring. In this exemplary arrangement, an external diameter of the bearing element 14 in the region of the external thread 28 is configured so as to be larger than in the region of the annular groove 29.

The bearing element 14 has an annular wall portion 30. In this exemplary arrangement, the external diameter of the annular wall portion 30 is configured so as to be smaller than the external diameter in the region of the external thread 28.

According to FIG. 1, the annular wall portion 20 serves for receiving the readjustment installation 17. A retaining groove 31 is configured in an internal side of the wall portion 30. The retaining groove here extends in the radial extension of that side 32 of the bearing element 14 that according to FIG. 1 faces the readjustment installation 17. The side 32 simultaneously forms a base for the interior, formed by the annular wall portion 20. The retaining groove 31 has a height 33 which extends parallel to the central longitudinal axis 8.

As will be better seen hereunder, the internal side of the annular wall portion 30 in this exemplary arrangement has two mutually opposite introduction grooves 34, 35 which are aligned parallel to the central longitudinal axis 8.

Figure 4:
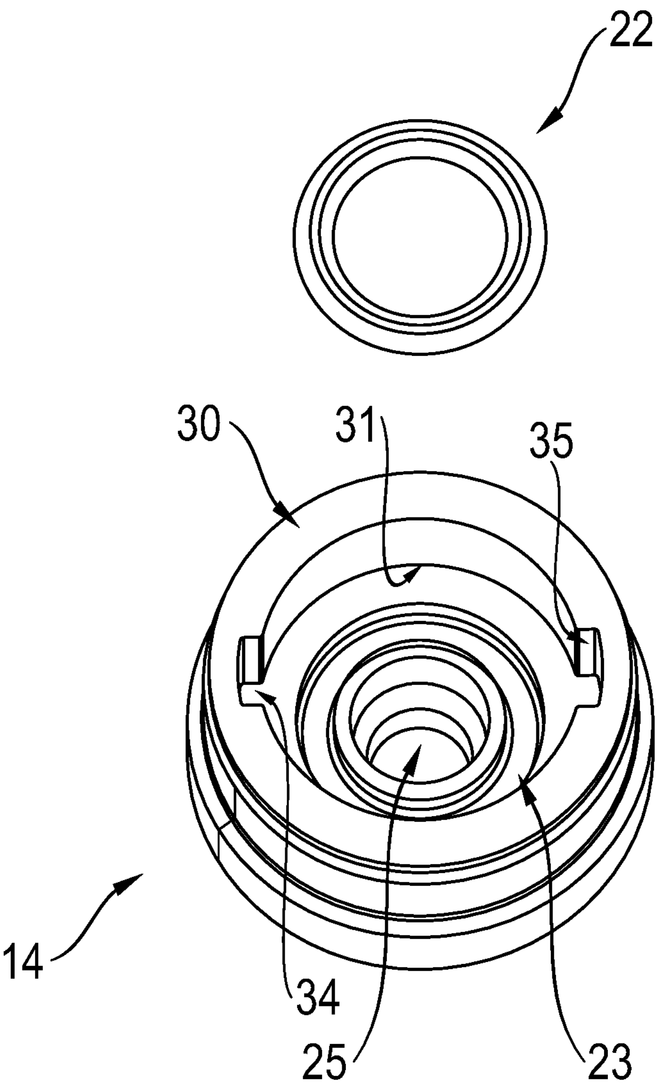
FIG. 4 shows a perspective view of the bearing element and of a first spring element for the first device according to the disclosure and according to FIG. 1 or 2, in a non-assembled state.

FIG. 4 shows a perspective view of the bearing element 14 and of the first spring element 22 in the configuration as an O-ring for the first device 2 according to the disclosure and according to FIG. 1 or 2, in a non-assembled state. In order for the spring element 22 to be assembled, the latter is disposed in the depression 23 which is configured so as to correspond to the design of the spring element 22. The two introduction grooves 34, 35, which are configured in the internal side of the annular wall portion 30, can moreover be readily seen here, the introduction grooves 34, 35 serving for introducing or assembling the play delimitation element 24, as is yet to be illustrated hereunder.

Figure 5:
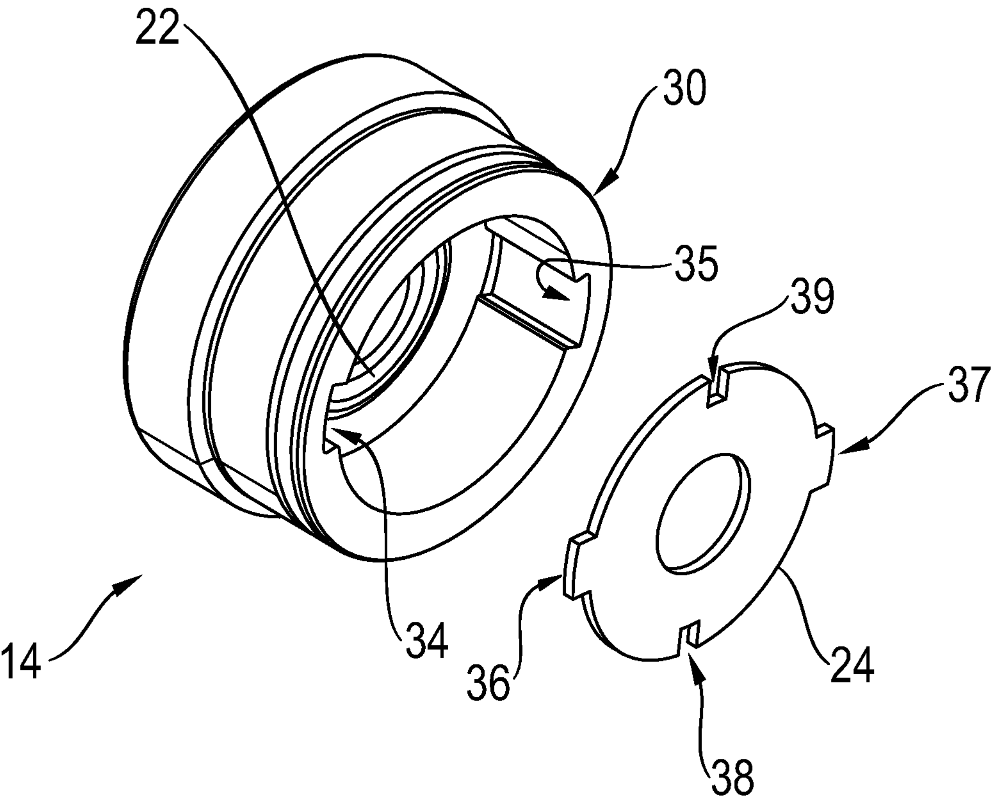
FIG. 5 shows a perspective view of the bearing element having the assembled first spring element and a non-assembled play delimitation element for the first device according to the disclosure and according to FIG. 1 or 2.

FIG. 5 shows a perspective view of the bearing element 14 having the assembled first spring element 22 and the non-assembled play delimitation element 24 for the first device 2 according to the disclosure and according to FIG. 1 or 2. The spring element 22 configured as an O-ring is disposed in the annular depression 23 according to FIG. 4. The play delimitation element 24 is formed as an annular washer and in this exemplary arrangement from metal. The play delimitation element 24 in this exemplary arrangement has two outer peripheral portions 36, 37 which in relation to the central longitudinal axis 8 according to FIG. 1 project radially outward. The two peripheral portions 36, 37 here face away from one another. The peripheral portions 36, 37 and the introduction grooves 34, 35 are configured in a mutually corresponding manner. With the exception of the peripheral portions 36, 37, or with the exception of the introduction grooves 34, 35, respectively, an external diameter of the play delimitation element 24 in terms of shape is configured so as to correspond to an internal diameter of the annular wall portion 30. For assembling the play delimitation element 24, the peripheral portions 36, 37 are guided by way of the introduction grooves 34, 35 until the play delimitation element 24 rests on the spring element 22.

In this exemplary arrangement, the play delimitation element 24 has two recesses 38, 39 for interacting with an introduction tool not illustrated in more detail here. The two recesses 38, 39 in this exemplary arrangement are implemented as two slots which are disposed so as to face away from one another on the external circumference of the annular play delimitation element 24. In this example, the recesses 38, 39 are disposed at an angle of 90° in relation to the peripheral portions 36, 37.

Figure 6:
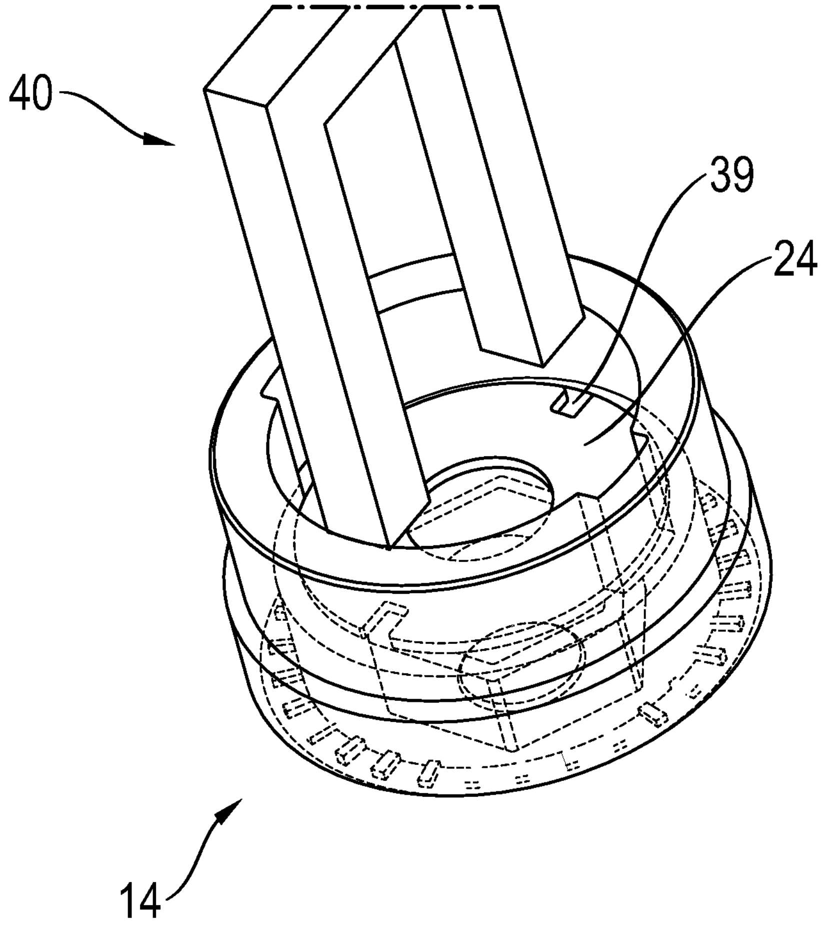
FIG. 6 shows a partially transparent perspective view of the bearing element having the assembled first spring element and the partially assembled play delimitation element for the first device according to the disclosure and according to FIG. 1 or 2.

FIG. 6 shows a partially transparent perspective view of the bearing element 14 having the assembled first spring element 22 and the partially assembled play delimitation element 24 for the first device 2 according to the disclosure and according to FIG. 1 or 2. An introduction tool 40, only schematically indicated here, serves for assembling the play delimitation element 24 in the bearing element 14. The introduction tool 40 here is configured for interacting with the recesses 38, 39 according to FIG. 5.

The play delimitation element 24 by the introduction tool 40 is pressed in the direction of the bearing element 14 until the play delimitation element 24 rests on the side 32 of the bearing element 14 according to FIG. 3. The play delimitation element 24 by the introduction tool 40 is subsequently rotated in relation to the bearing element 14 and by approx. 90° about the central longitudinal axis 8 according to FIG. 1 or 3. As will yet be illustrated in more detail hereunder, the peripheral portions 36, 37 of the play delimitation element 24 in the process make their way into the retaining groove 31 of the bearing element 14; cf. FIG. 7 hereunder for reference.

Figure 7:
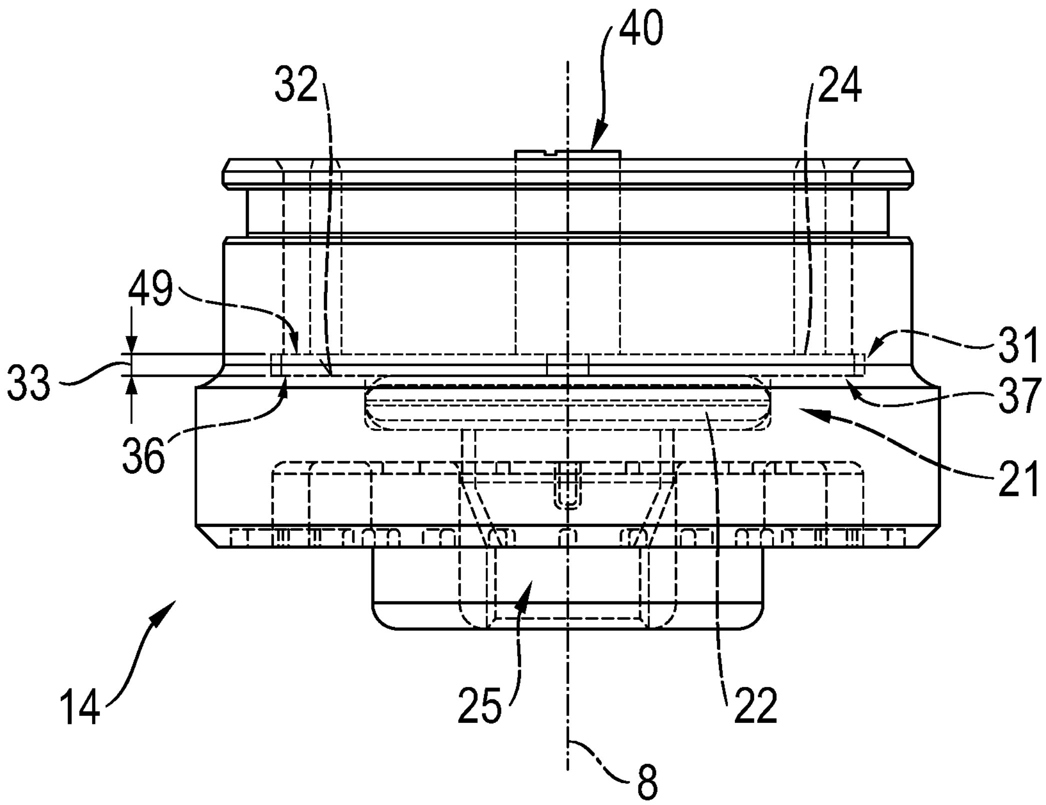
FIG. 7 shows a partially transparent perspective lateral view of the bearing element having the assembled first spring element and the assembled play delimitation element for the first device according to the disclosure and according to FIG. 1 or 2.

FIG. 7 shows a partially transparent perspective lateral view of the bearing element 14 having the assembled first spring element 22 and the assembled play delimitation element 24 for the first device 2 according to the disclosure and according to FIG. 1 or 2. By rotating the play delimitation element 24 by the introduction tool 40, the peripheral portions 36, 37 of the play delimitation element 24 make their way into the retaining groove 31. The play delimitation element 24 is reliably held in the retaining groove 31 as a result.

The height 33 of the retaining groove 31 in relation to the material thickness of the peripheral portions 36, 37, or of the play delimitation element 24, respectively, here is configured in such a manner that this results in a mobility of the play delimitation element 24 in the longitudinal direction of the central longitudinal axis 8 so that a minimum play for the thrust piece 5 according to FIG. 1 is defined due to the interaction between the spring element 22 and the axial play installation 21. In other words, a maximum projecting measurement 49 by which the spring element 22 can extend from the depression 23 is defined by the play delimitation element 24 in interaction with the height of the retaining groove 31. In this exemplary arrangement, the maximum projecting measurement 49, or the minimum play of the thrust piece 5 according to FIG. 1, respectively, in the axial direction of the central longitudinal axis 8 is approximately or exactly 60 μm.

Figure 8:
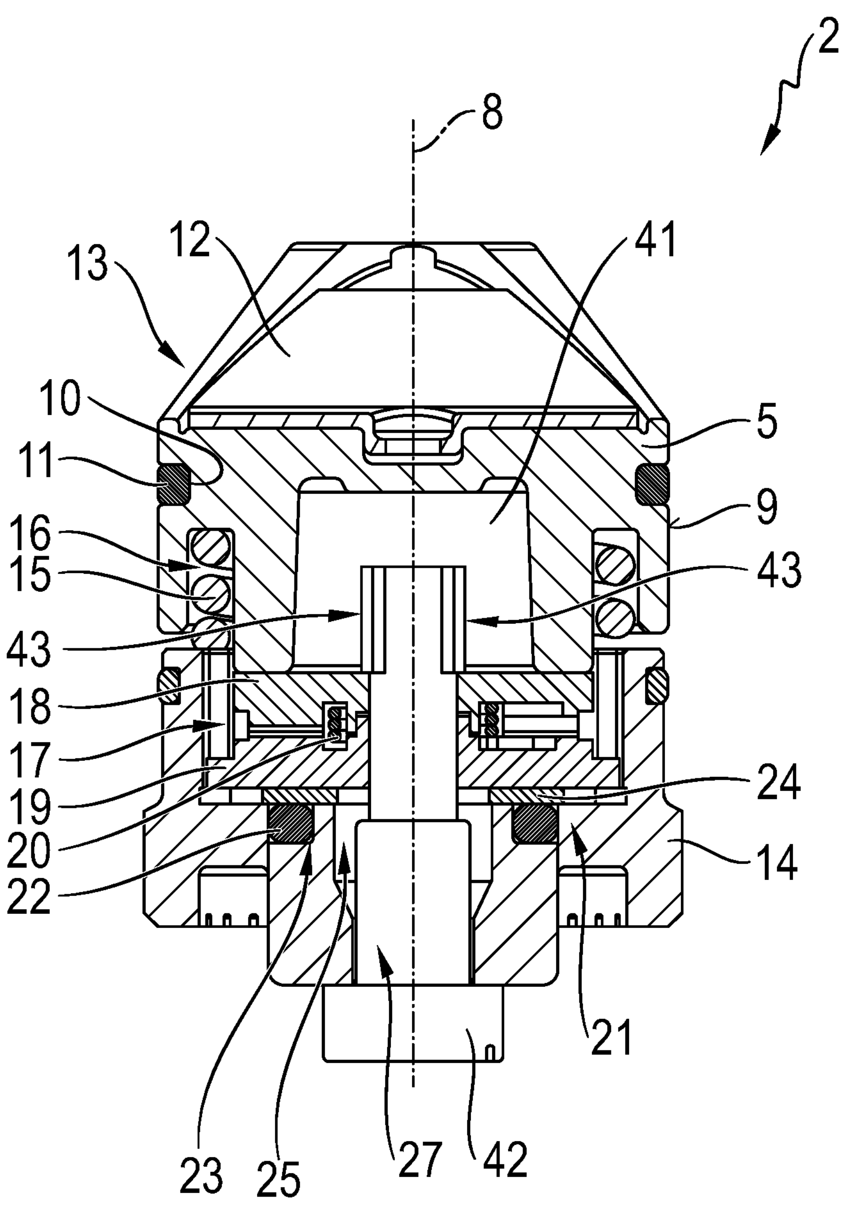
FIG. 8 shows a sectional lateral view of the first device according to the disclosure, having an assembling element.

FIG. 8 shows a sectional lateral view of the first device 2 according to the disclosure, having the assembling element 27. The readjustment installation 17, the axial play installation 21 and the bearing element 14 for the purpose of assembling the device 2 in the steering device 1, or in the housing 6 according to FIG. 1, are held together by the assembling element 27 which in this exemplary arrangement is configured in the manner of a pin. To this end, the assembling element 27 extends through the through opening 25 of the bearing element 14 and corresponding openings of the play delimitation element 24 and of the readjustment installation 17 into a vacant space 41 of the thrust piece 5. In the process, the assembling element 27 by a head piece 42 is supported on an external side of the bearing element 14, on the one hand, and by retaining portions 43 is supported on a side of the readjustment installation 21, or of the first disk 18, respectively, that faces away from the bearing element 14, on the other hand.

FIGS. 9*a* to 9*e* show different views and states of an assembly module for producing the first device 2 according to the disclosure and according to FIG. 8.

Figure 9A:
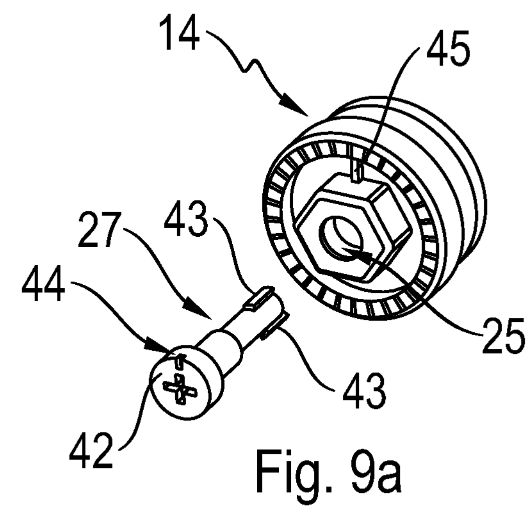
FIGS. 9*a*-9*e* show different views of an assembly module for implementing the first device according to the disclosure and according to FIG. 8.

Shown according to FIG. 9*a* is the bearing element 14 according to FIG. 7. The spring element 22, which cannot be seen in more detail here, and the play delimitation element 24 are thus already assembled in the bearing element 14. Furthermore, the readjustment installation 17, which likewise cannot be seen in more detail here, is already disposed in the bearing element 14. The pin-type assembling element 27 is now used so as to provide an assembly module composed of the bearing element 14, the axial play installation 21 and the readjustment installation 17.

The assembling element 27 on a first end has the head piece 42, and on an end, which faces away from the first end or from the head piece 42, has a plurality of retaining portions 43, in this exemplary arrangement three retaining portions 43. The retaining portions 43 are configured as web-type protrusions and are disposed so as to be uniformly distributed on the circumference of the assembling element 27. In other words, the retaining portions project outward in the radial direction to a longitudinal axis of the assembling element 27.

The assembling element 27 furthermore has a first positioning mark 44. In this exemplary arrangement, the head piece 42 has the first positioning mark 44. In this exemplary arrangement, the first positioning mark 44 is configured in an end side of the head piece 42. The bearing element 14 has a second positioning mark 45. The second positioning mark 45 in this exemplary arrangement is disposed on a side that faces away from the side 32 according to FIG. 3, the latter not able to be seen in more detail here. The positioning marks 44, 45 by way of example here are configured as webs or grooves, respectively.

Figure 9B:
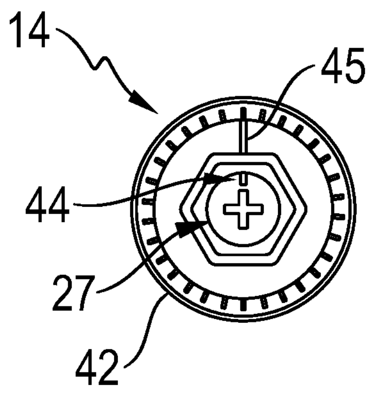

For introducing the assembling element 27 through the through opening 25 and through the axial play installation 21, which cannot be seen in more detail here, and the readjustment installation 17, the assembling element 27 according to FIG. 9*b* is aligned in such a manner that the first positioning mark 44 and the second positioning mark 45 are correspondingly co-aligned. In this exemplary arrangement, the two positioning marks 44, 45 are co-aligned so as to lie on a common line.

Figure 9C:
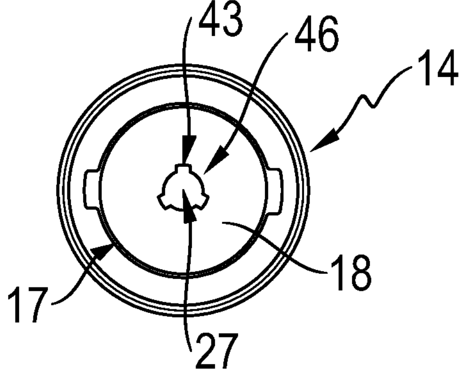

According to FIG. 9*c*, the readjustment installation 17, or at least the disk 18, respectively, has an opening 46 which in terms of shape corresponds to the cross section of that end of the assembling element 27 with the retaining portions 43 that faces away from the head piece 42.

While introducing the assembling element 27 in the context of FIGS. 9*a* to 9*c*, the readjustment installation 17 in a way not illustrated in more detail here is pressed in the direction of the bearing element 14, as a result of which the spring element 22 of the axial play installation 21 is also compressed. As a result, the play delimitation element 24, which cannot be seen in more detail here, rests on the side 32 of the bearing element 14 that is shown in FIG. 3. The spring element 22 in the process is pressed completely into the depression 23.

Figure 9D:
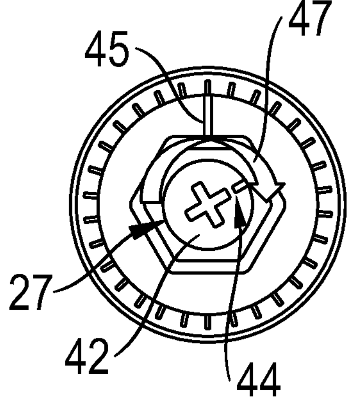

Thereafter, the assembling element 27 is rotated according to the arrow 47 according to FIG. 9*d*. As a result, the initially corresponding orientation of the two positioning marks 44, 45 is cancelled. In this exemplary arrangement, the assembling element 27 is rotated about its longitudinal axis by approximately 60°.

Figure 9E:
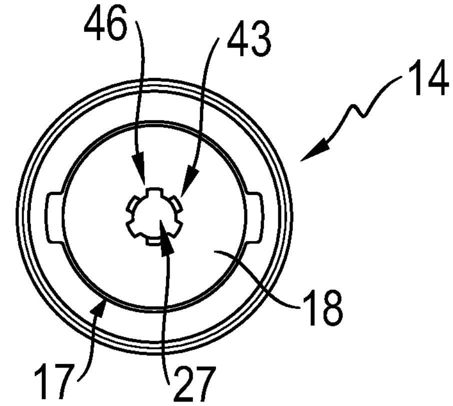

As a result, the retaining portions 43 according to FIG. 9*e* engage behind the readjustment installation 17, or the disk 18, respectively. The desired assembly module composed of the assembling element 27, the bearing element 14, the axial play installation 21 and the readjustment installation 17, is formed as a result. In contrast, the thrust piece 5 and the preloading element 15 are not a component part of the assembly module.

For assembling the device 2 in the housing 6 according to FIG. 1, the thrust piece 5 and the preloading element 15 as individual components are first screwed into the housing interior 7, and the assembly module described above is subsequently screwed into the latter. The assembling element 27 is finally removed again and replaced by the closure element 26.

Figure 10:
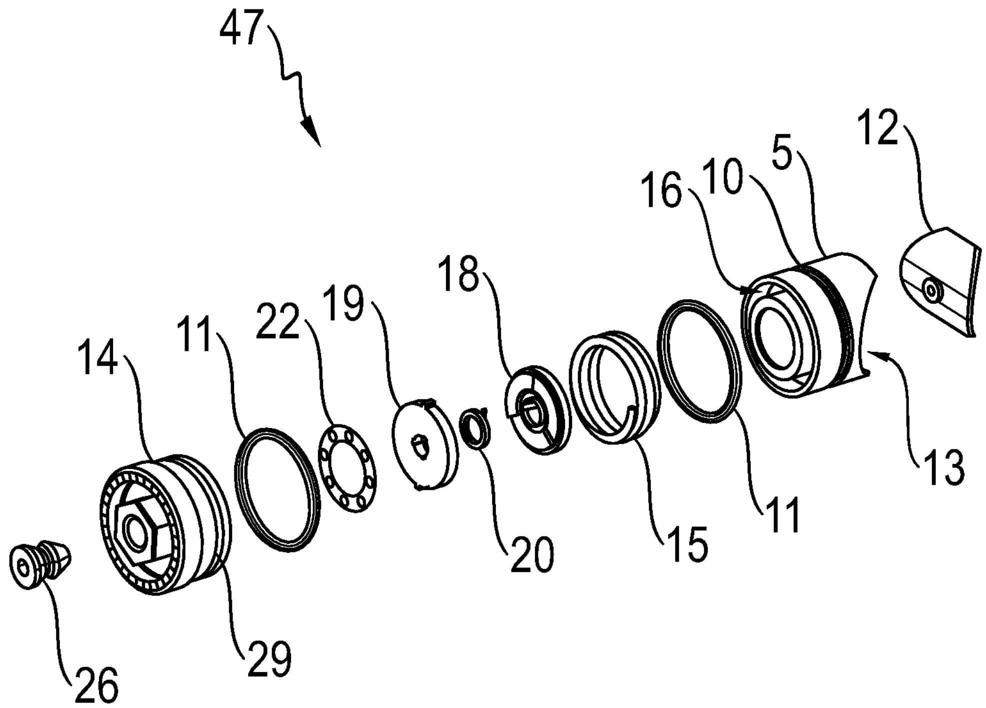
FIG. 10 shows an exploded illustration of individual parts of a further device according to the disclosure.

FIG. 10 shows an exploded illustration of individual parts of a further device 47 according to the disclosure. Identical features are provided with the same reference signs as above. To this extent, reference is also made to the preceding description for the avoidance of repetitions.

As opposed to the device 2 according to FIG. 1 or 2, the play delimitation element 24 of the device 2 has been omitted in the device 47 shown here, and the spring element 22 in the device 47 is configured as an annular spring washer, in this exemplary arrangement as a corrugated spring washer. Furthermore, a further seal 11 for the annular groove 29 of the bearing element 14 is illustrated here additionally to the seal 11 for the groove 10 of the thrust piece 5; cf. also FIG. 11 hereunder.

Figure 11:
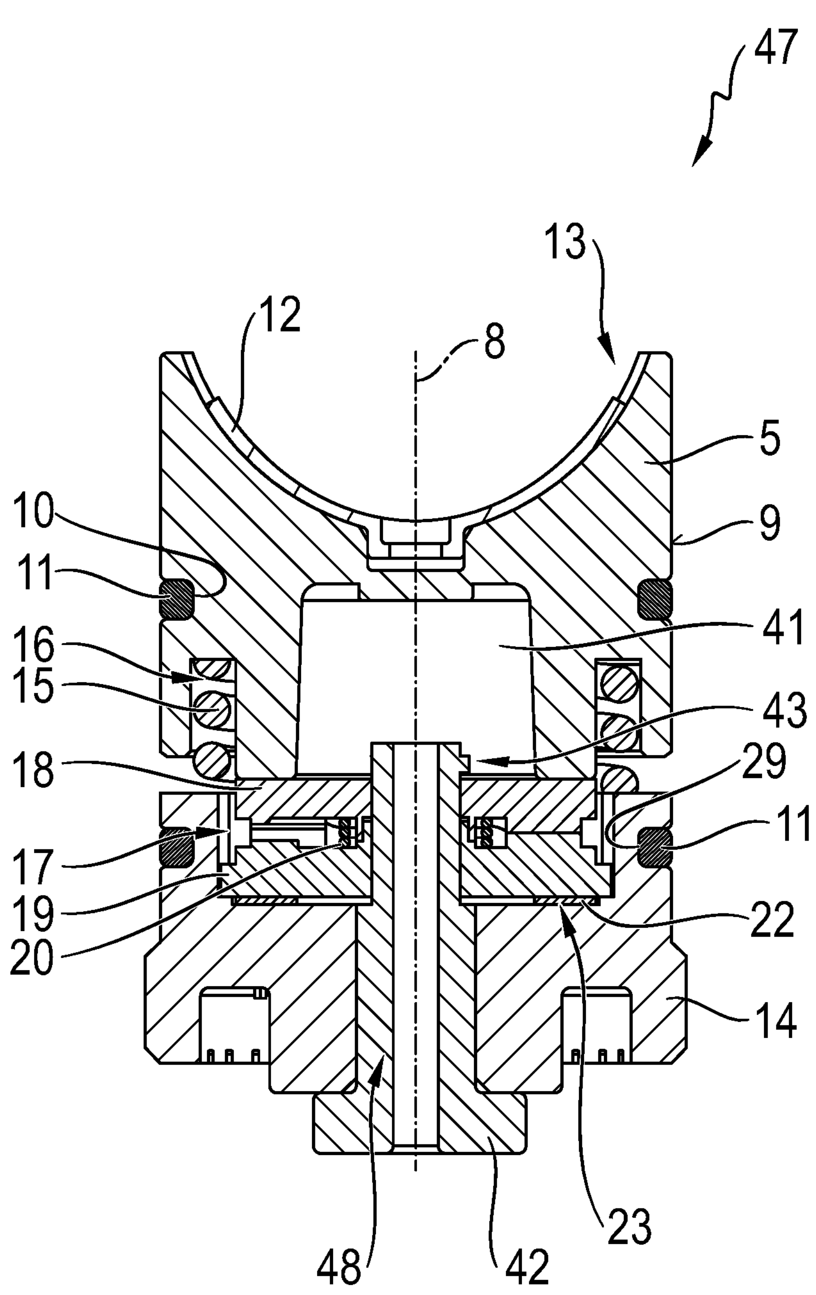
FIG. 11 shows a sectional lateral view of the further device according to the disclosure, having an assembly pin.

FIG. 11 shows a sectional lateral view of the further device 47 according to the disclosure having an assembling element 48, the fundamental construction of the latter corresponding to that of the assembling element 27.

The bearing element 14 of the device 47 in this exemplary arrangement has a depression 23 which is configured as a hollow-cylindrical depression 23. The spring element 22, which here is configured as an annular spring washer, is disposed in the hollow-cylindrical depression 23. The spring element 22, configured as an annular spring washer, here is supported on a base area of the depression 23 and on the readjustment installation 17, or presently the disk 19, respectively.

The assembly module composed of the assembling element 48, the bearing element 14, the axial play installation 21 and the readjustment installation 17, is formed by the assembling element 48.

Figure 12A:
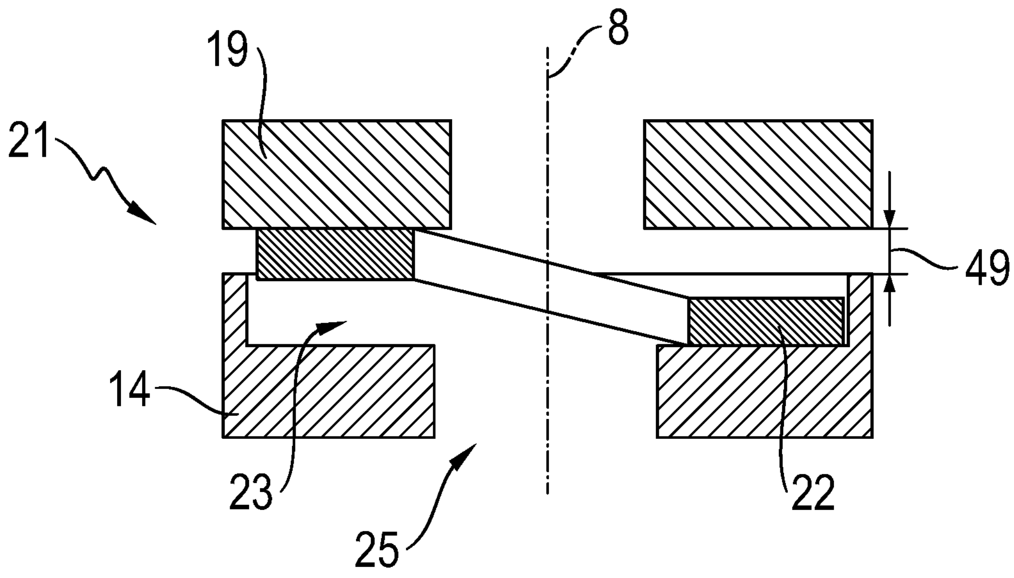
FIGS. 12*a*-*b* show fragments of schematic sectional lateral views of a further spring element for the further device according to the disclosure.
Figure 12B:
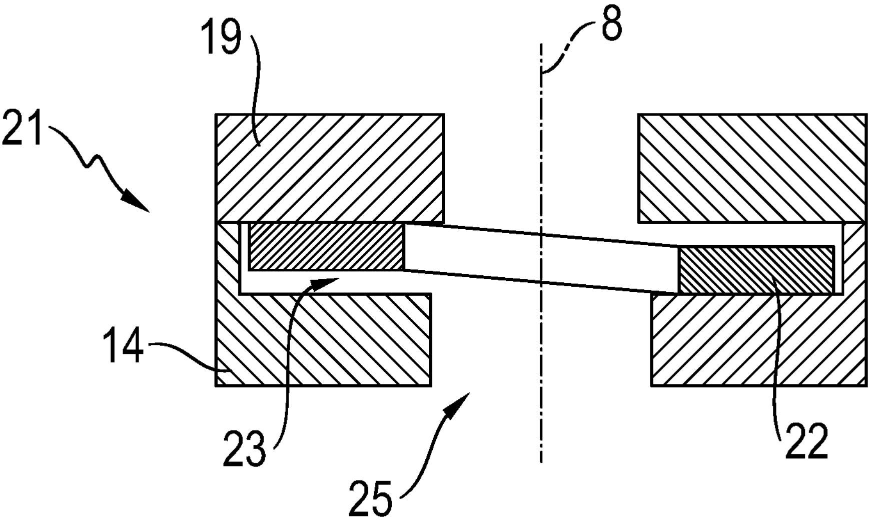

FIGS. 12*a* and 12*b* show fragments of schematic sectional lateral views of the spring element 22 for the further device 47 according to the disclosure and according to FIGS. 10 and 11.

FIG. 12*a* shows the axial play installation 21 for the device 47 according to FIGS. 10 and 11 in an operating state. The spring element 22 by a defined maximum projecting measurement 49 extends from the depression 23 of the schematically indicated bearing element 14 in the direction of the schematically indicated disk 19. The maximum projecting measurement 49 here simultaneously determines the maximum spacing, or the maximum play, respectively, between the bearing element 14 and the readjustment installation 17, or the disk 19, respectively, in the axial direction of the central longitudinal axis 8. As a result, a minimum play of the thrust piece 5 is simultaneously defined in a way not illustrated in more detail here.

FIG. 12*b* shows the axial play installation 21 of the device 47 in an assembled state, as is derived by the assembling element 48 according to FIG. 11. In the assembled state, the readjustment installation 17 by the assembling element 48 is drawn in the direction of the bearing element 14 so that the disk 19 rests on the bearing element 14. As a result, the spring element 22 of the device 47 in the assembled state is disposed completely within the depression 23. Once the assembling element 48 has been removed, the axial play installation 21 transfers to the operating state according to FIG. 12*a*.

The invention claimed is:

1. A device for pressing a rack against a pinion, comprising:

a thrust piece defining an annular groove, inboard of an outer circumferential surface of the thrust piece, a bearing element, and a preloading element which acts in an axial direction of a central longitudinal axis of the device, wherein the preloading element is disposed within the annular groove so as to be positioned between the bearing element and the thrust piece and wherein the preloading element provides a preloading force acting against the thrust piece in the axial direction to the central longitudinal axis and directed away from the bearing element, a readjustment installation for compensating wear, the readjustment installation being disposed between the thrust piece and the bearing element, and an axial play installation for defining a minimum play of the thrust piece in the axial direction to the central longitudinal axis, the axial play installation being disposed between the readjustment installation and the bearing element, and the axial play installation having an elastic spring element which acts in the axial direction to the central longitudinal axis, wherein the spring element is mounted in a depression, the depression being configured in a side of the bearing element that faces the readjustment installation.

2. The device as claimed in claim 1, wherein the spring element, extends from the depression up to a defined maximum projecting measurement and in the axial direction of the central longitudinal axis exerts directly or indirectly a compressive force on the readjustment installation, the projecting measurement defining a minimum play of the readjustment installation and/or of the thrust piece in the axial direction of the central longitudinal axis.

3. The device as claimed in claim 2, wherein the maximum projecting measurement is less than 150 μm, and/or the minimum play of the readjustment installation and/or of the thrust piece in the axial direction of the central longitudinal axis of less than 150 μm being determined by the spring element.

4. The device as claimed in claim 1, wherein the depression is configured as a groove, a central axis of the depression coinciding with the central longitudinal axis of the device.

5. The device as claimed in claim 1, wherein the elastic spring element is configured as an O-ring or as an annular spring washer.

6. The device as claimed in claim 1, wherein the axial play installation has a play delimitation element, the play delimitation element being disposed between the elastic spring element and the readjustment installation, a maximum projecting measurement by which the spring element extends from the depression being defined by the play delimitation element.

7. The device as claimed in claim 1, wherein the bearing element has an annular wall portion for receiving the readjustment installation, the retaining groove being configured in an internal side and in the radial extension of that side of the bearing element that faces the readjustment installation, the internal side of the annular wall portion having at least one introduction groove which for introducing the peripheral portion of the play delimitation element is aligned parallel to the central longitudinal axis.

8. The device as claimed in claim 6, wherein the play delimitation element is configured as an annular washer.

9. A steering device for a vehicle, and having a rack which is mounted so as to be displaceable in the direction of a longitudinal axis of the rack, and having a pinion, the rack engaging in the pinion, and having a device as claimed in claim 1, the rack being pressed against the pinion, and the thrust piece being disposed so as to be displaceable within a housing and in the axial direction of the central longitudinal axis, the bearing element being fixed to the housing.

10. A method for producing a device as claimed in claim 1, in which the thrust piece and the preloading element as individual components are first inserted into a housing interior of a housing, and an assembly module, composed of an assembling element, the bearing element, the axial play installation and the readjustment installation, is subsequently fixed in the housing, the spring element in an assembled state being received completely within the depression configured in the bearing element.

11. A device for pressing a rack against a pinion, the device including:

a thrust piece defining an annular groove, inboard of an outer circumferential surface of the thrust piece, a bearing element, and a preloading element which acts in the axial direction of a central longitudinal axis of the device, wherein the preloading element is disposed within the annular groove so as to be positioned between the bearing element and the thrust piece and wherein the preloading elements provides a preloading force acting on the thrust piece in the axial direction to the central longitudinal axis and directed away from the bearing element, a readjustment installation for compensating wear, the readjustment installation being disposed between the thrust piece and the bearing element, and an axial play installation for defining a minimum play of the thrust piece in the axial direction to the central longitudinal axis, the axial play installation being disposed between the readjustment installation and the bearing element, and the axial play installation having an elastic spring element that acts in the axial direction to the central longitudinal axis, wherein the spring element is mounted in a depression.

12. The device as claimed in claim 11, wherein the spring element extends from the depression up to a defined maximum projecting measurement and in the axial direction of the central longitudinal axis exerts directly or indirectly a compressive force on the readjustment installation.

13. The device as claimed in claim 11, wherein the depression is configured as a groove, a central axis of the depression coinciding with the central longitudinal axis of the device.

14. The device as claimed in claim 11, wherein the elastic spring element is configured as an O-ring or as an annular spring washer.

15. A device for pressing a rack against a pinion, comprising:

a thrust piece, a bearing element, and a preloading element which acts in an axial direction of a central longitudinal axis of the device, wherein the preloading element is disposed between the bearing element and the thrust piece and wherein the preloading element provides a preloading force acting against the thrust piece in the axial direction to the central longitudinal axis and directed away from the bearing element, a readjustment installation for compensating wear, the readjustment installation being disposed between the thrust piece and the bearing element, and an axial play installation for defining a minimum play of the thrust piece in the axial direction to the central longitudinal axis, the axial play installation being disposed between the readjustment installation and the bearing element, and the axial play installation having an elastic spring element which acts in the axial direction to the central longitudinal axis, wherein the spring element is mounted in a depression, the depression being configured in a side of the bearing element that faces the readjustment installation, wherein the axial play installation has a play delimitation element, the play delimitation element being disposed between the elastic spring element and the readjustment installation, a maximum projecting measurement by which the spring element extends from the depression being defined by the play delimitation element, and wherein at least one outer peripheral portion of the play delimitation element, which is radial in relation to the central longitudinal axis, is disposed in a retaining groove of the bearing element, wherein the play delimitation element includes two radial peripheral portions, which face away from one another, wherein a maximum projecting measurement by which the spring element extends from the depression is defined by the play delimitation element in interaction with the height of the retaining groove.

* * * * *